United States Patent [19]

Stringaro

[11] Patent Number: 5,470,542
[45] Date of Patent: Nov. 28, 1995

[54] CATALYZING FIXED BED REACTOR

[75] Inventor: Jean P. Stringaro, Winterthur, Switzerland

[73] Assignee: Sulzer Chemtech AG, Winterthur, Switzerland

[21] Appl. No.: 265,586

[22] Filed: Jun. 23, 1994

[30] Foreign Application Priority Data

Jun. 30, 1993 [EP] European Pat. Off. .............. 93810463

[51] Int. Cl.$^6$ .................................. B01J 8/02; B01J 8/04
[52] U.S. Cl. ........................ 422/211; 422/191; 422/311
[58] Field of Search ................................ 422/310, 211, 422/311, 191; 203/DIG. 6

[56] References Cited

U.S. PATENT DOCUMENTS 5,073,236 12/1991 Gelbeim et al. ..................... 422/191

FOREIGN PATENT DOCUMENTS 0428265 5/1991 European Pat. Off. .
WO90/02603 3/1990 WIPO .

*Primary Examiner*—Robert J. Warden
*Assistant Examiner*—Robert Carpenter
*Attorney, Agent, or Firm*—Townsend and Townsend and Crew

[57] ABSTRACT

The catalyzing fixed bed reactor (100) for at least one fluid medium has packing elements (10) disposed in stacks, which are composed of layers aligned along the main direction of flow (2). The layers are formed by cushion-like packing parts (1), the walls (1a, 1b) of which are permeable to the medium. The packing parts contain a catalyst material (3). The spaces in the packing parts are flow ducts, which intersect and are open with respect to one another. The interior spaces of the packing parts are formed by parallel ducts (11), which are provided in the form of a relief-type profiling of the walls (1a, 1b), so that the these ducts intersect, are open in relation to one another and are also sealed at the edge (12) of the packing parts. The walls also touch one another in the inner region of the packing parts, and the two walls are connected to one another at least at one part of these contact points (15).

13 Claims, 2 Drawing Sheets

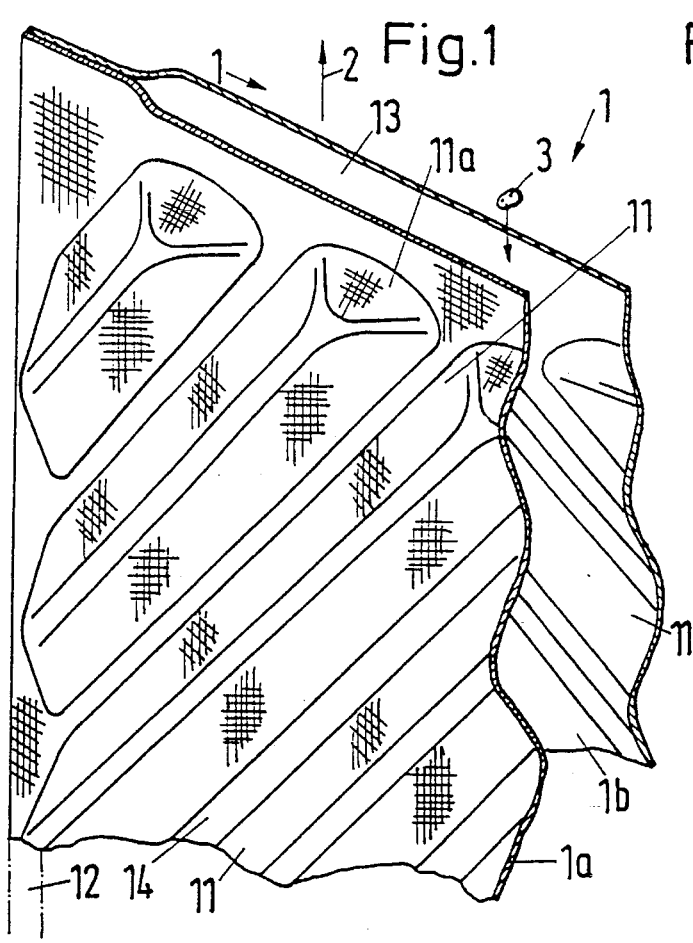
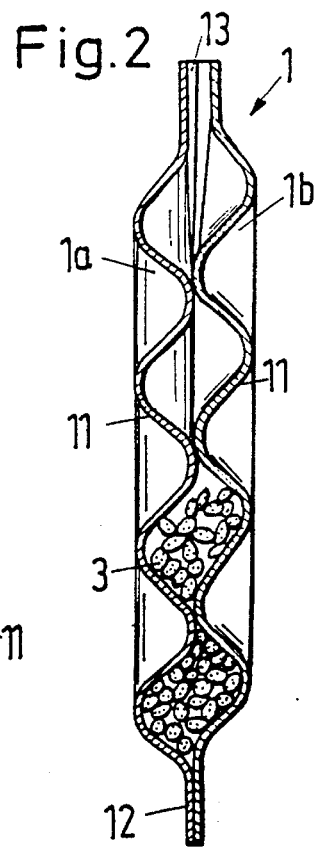
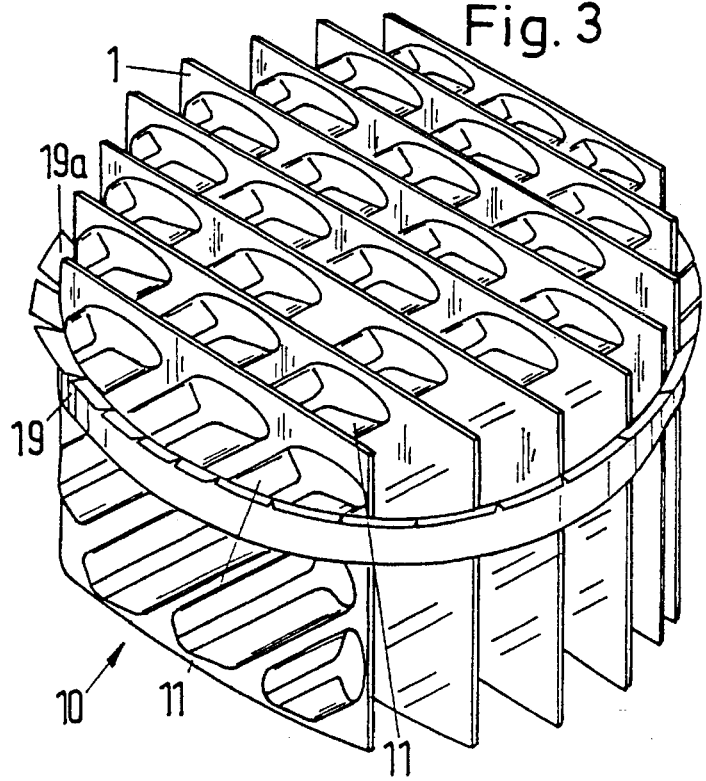
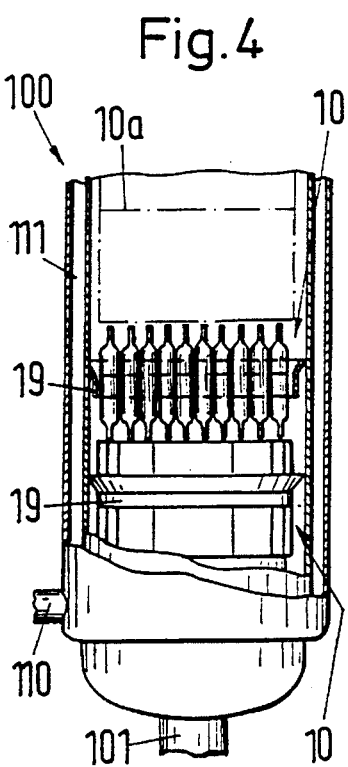

Fig. 5
Fig. 6
Fig. 7
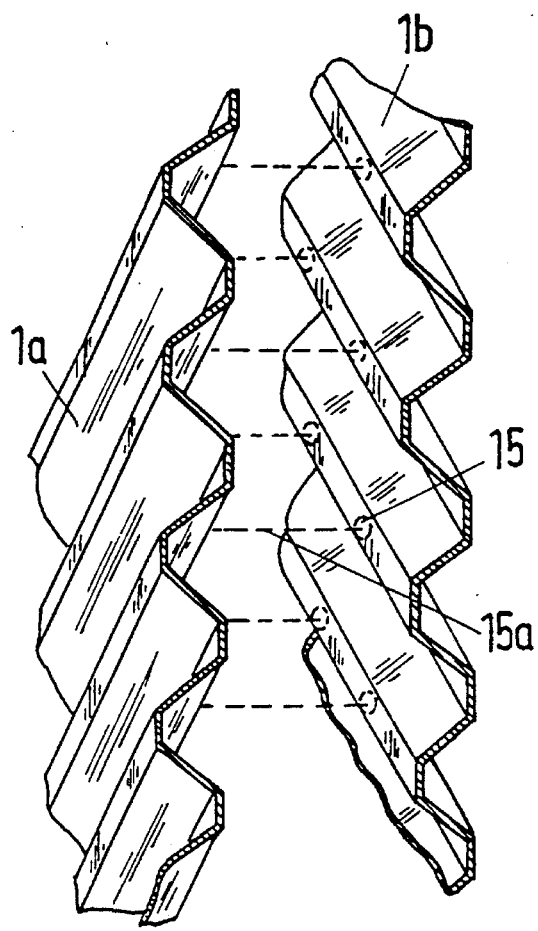
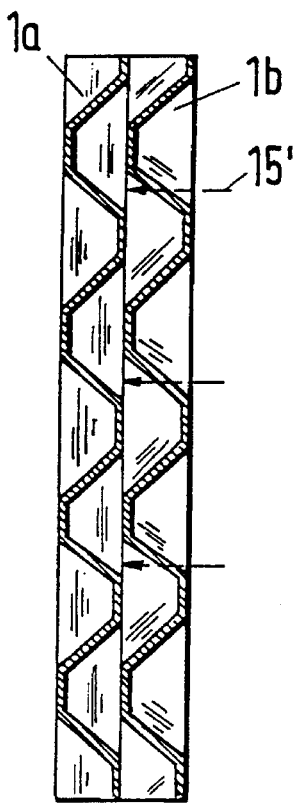
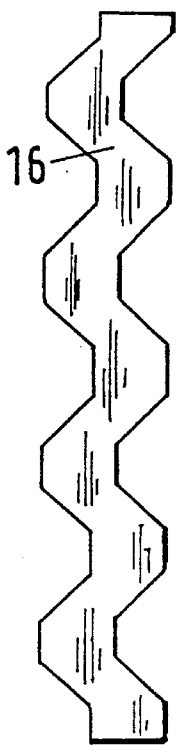

5,470,542

CATALYZING FIXED BED REACTOR

BACKGROUND OF THE INVENTION

The invention relates to a catalyzing fixed bed reactor such as the device disclosed in European Patent Specification 0 396 650. There an exemplified embodiment is described in relation to FIG. 5, i.e. a device which consists of folded layers disposed parallel to one another, each of which comprises a double shell, the walls of which are made from a material which is permeable to the reactants and impermeable to the catalyst material. A catalyst material which is chosen according to the intended use is inserted into the spaces formed by the double walls. The folds of the layers form an angle to the longitudinal axis (i.e. to the main direction of flow) of the device, so that the folds of adjacent layers intersect.

The flow ducts between the packing parts form a static mixer structure. Thanks to this mixer structure an equilibrium of temperature, velocity and concentration which is advantageous for the reaction occurs over the cross section of the column. Furthermore the fact that the pressure drops are relatively small is advantageous.

A disadvantage of the known device is that when filling the double shell of a packing part with catalyst material an unwanted widening of the space is produced because the walls are not sufficiently rigid.

SUMMARY OF THE INVENTION

It is therefore an object of the invention to create a packing element for the layers of which such a widening does not occur. This object is achieved by constructing each packing element of first and second fluid medium permeable, opposing sheets which define a space between them. Each sheet has a plurality of parallel corrugations which have closed ends, a substantially constant cross-section over their lengths and bulge outwardly away from the other sheet to define a space between the sheets. The corrugations of the first and second sheets, respectively, are nonparallel so that they intersect each other. The sheets touch each other at several contact points between the crossing corrugations at least some of which are connected to each other.

The invention also relates to the use of this device for a catalytic distillation process (cf. European Patent Specification 0 396 650), for the manufacture, for example, of MTBE (methyl tertiary butyl ether), ETBE (ethyl tertiary butyl ether) or TAME (tertiary amyl methyl ether).

If the reactor of the present invention is provided for—two fluid phases—for example a gaseous and a liquid phase the two phases can be performed both in a counter-flow arrangement and also in the co-current flow. The two phases may also both be fluid, if they cannot be mixed and have different densities. The reactor may for example also be a washing column or bubble column.

BRIEF DESCRIPTION OF THE DRAWINGS

FIG. 1 shows a detail of an upper zone of a packing part of the reactor according to the invention, FIG. 2 shows a cross section in the main direction of flow through the packing part in FIG. 1, FIG. 3 shows a perspective view of a packing element of the reactor according to the invention, FIG. 4 shows a detail of a longitudinal section through a reactor according to the invention, FIG. 5 shows a detail of the walls of a packing part in an exploded representation, FIG. 6 shows a cross section through the packing part in FIG. 5 having communicating walls, and FIG. 7 shows a closing element for the edge of the same packing part.

DESCRIPTION OF THE PREFERRED EMBODIMENTS

The packing part 1 shown in FIG. 1 has two walls 1a and 1b. These walls, which are made for example from wire cloth, are constructed with a profile comprising raised portions 11. The two walls are welded, for example, at lateral edge zones 12, so that they are form a cushion which is open at the top. The raised portions 11 formed like hip roofs, which enclose an angle towards the main direction of flow 2, and form ducts having end portions 11a inside the packing part. The two walls 1a and 1b have substantially the same profile and are disposed in such a manner that the inner ducts, which are open to one another, intersect. Catalytic material 3 in granulate form can be introduced through the upper aperture 13. FIG. 2 shows a section through the packing part 1, which is partly filled with the bulk-like material 3.

Walls 1a and 1b touch in punctiform manner in the inner region 14 of the packing part 1; the two walls are connected to one another, for example by spot welding or by rivets, at least at one part of these contact points.

A vibrating device is helpful to fill the packing parts 1 with the catalyst material 3. After filling the upper edge is advantageously closed with clamps or other connection means at the aperture 13. These connection means should be easy to remove and replace, so that the packing elements can be easily emptied and are thus suitable for reuse in the event the catalyst material must be replaced.

The packing element 10 represented in FIG. 3 is constructed from eight layers—of packing parts 1. This packing element 10 is provided for a reactor housing having a circular cross-section. A collar 19 having tab-like projections 19a surrounds the packing element. The lateral raised portions 11 of the packing parts 1 form flow ducts, which cross one another and are open to one another.

FIG. 4 shows the lower part of a reactor 100 according to the invention, in which the packing elements 10 are disposed in stacks, whereby adjacent packing elements are offset by an angle of 90°. The upper packing elements are indicated by the dot-dash edge lines 10a. The connection piece 101 is provided for the inflow or outflow of the fluid medium. A cooling jacket 111 (cooling medium connection piece 110) is provided for the dissipation of reaction heat.

FIG. 5 illustrates the cross-wise arrangement of the two profiled walls 1a and 1b of a packing part 1 by means of a second example. The two walls are forced together along the lines 15a shown as broken lines, and contact at contact each other points 15. The walls of the present exemplified embodiment are undulating and are made from a foil-like material, which comprises a perforation (not represented). This perforation enables the passage of the fluid medium, but holds back the catalyst material in the interior.

FIG. 6 is a section through the packing part 1 of FIG. 5 along a center line (not shown) between the indicated contact points 15. The arrows 15' point to places where contact points 15 are situated, which lie on a straight line. If the walls 1a and 1b are dimensioned and disposed so that the edges of the packing parts 1 assume the appearance of the section shown in FIG. 6, the inner ducts can be sealed—as represented in FIG. 7—by strip-shaped sealing elements 16. It is also possible to use tubular sealing elements bent serpentine-fashion, for example, as duct closing members, which at the edge of the packing parts 1 are inserted and fastened between the walls 1a and 1b.

In European Patent Specification 0 396 650 the use of catalytic solutions or liquid catalyst materials is also specified. This is also possible for the reactor described here, if for example the walls of the packing parts are constructed in two layers, in which case one layer is made from a fluid-tight membrane permeable to the fluid medium and the other layer forms a stable, perforated support structure.

What is claimed is:

1. A catalyzing fixed bed reactor for at least one fluid medium comprising a reactor housing, said housing including a plurality of, stacked packing elements aligned with a main direction of flow through the reactor, each packing element including first and second fluid medium permeable, opposing sheets defining a space between them, each sheet having a plurality of parallel corrugations which have closed ends, a substantially constant cross-section over their lengths and bulge outwardly away from the other sheet to define a space between the sheets, the corrugations of the first and second sheets, respectively, being nonparallel so that they intersect each other, the first and second sheets having peripheries, portions of the sheets spaced inwardly of the peripheries and between the corrugations of the respective sheets touching each other to define contact points between the sheets, the first and second sheets being connected to each other at at least one of the contact points, and a catalyst material disposed in the space.

2. A fixed bed reactor according to claim 1 wherein the catalyst material comprises a granular bulk material.

3. A fixed bed reactor according to claim 1 wherein the sheets of the packing elements are made from wire cloth.

4. A fixed bed reactor according to claim 1 wherein the corrugations in the sheets define raised portions having a hipped roof shape.

5. A fixed bed reactor according to claim 1 wherein the sheets are made from perforated, foil material, and including sealing elements defining the closed ends of the corrugations.

6. A fixed bed reactor according to claim 1 wherein the packing elements are upright and each includes an upper edge section made of a flexible material for opening the element along its upper edge and providing access to the interior space for placing the catalyst material into or removing it from the space, and including a removable fastener applied to the upper edge sections for maintaining the upper edge closed until the fastener is removed.

7. A fixed bed reactor according to claim 1 wherein the catalyst material is a liquid, and including a membrane placed against a side of each sheet facing the other sheet, the membrane being impermeable by the liquid and permeable by the fluid medium, each membrane being sealed to the other and the liquid catalyst material being disposed between the membranes, the sheets forming a stable fluid permeable support structure for the membranes.

8. A packing element for a catalyzing fixed bed reactor for at least one fluid medium, the packing element comprising first and second opposing fluid medium permeable sheets each having a periphery, a plurality of unidirectional, parallel trough-shaped corrugations of a substantially constant cross-section in each sheet having closed ends and bulging away from the opposing sheet to define an interior space between the sheets, the corrugations of the first sheet being angularly inclined relative to the corrugations of the second sheet so that the corrugations intersect each other and define a plurality of contact points where the first and second sheets contact each other, and means securing the first and second sheets to each other at at least one of the contact points so that a catalyst material can be placed into the interior space between the sheets for use of the sheet in the reactor.

9. A packing element according to claim 8 wherein the corrugation ends are located inwardly of the peripheries of the sheets.

10. A packing element according to claim 9 wherein the corrugation ends are defined by portions of the sheets.

11. A packing element according to claim 8 wherein the corrugation ends are located short of the peripheries of the sheets, and wherein each sheet includes a peripheral border which is substantially flat and placed flush against a corresponding flat peripheral border of the other sheet.

12. A packing element according to claim 11 wherein the sheets are made of a deformable material, wherein parts of the flat border of the sheets are permanently secured to each other and a section of the flat border of the sheets is adapted to be closed and opened for filling and replacing the catalyst material in the interior space, and including means for releasably closing the openable sections of the sheets.

13. A packing element for a catalyzing fixed bed reactor for at least one fluid medium, the packing element comprising first and second opposing fluid medium permeable sheets each having a periphery, a plurality of unidirectional, parallel trough-shaped corrugations of a substantially constant cross-section in each sheet having closed ends and bulging away from the opposing sheet to define an interior space between the sheets, the corrugations of the first sheet being angularly inclined relative to the corrugations of the second sheet so that the corrugations intersect each other and define a plurality of contact points where the first and second sheets contact each other, and means securing the first and second sheets to each other at at least one of the contact points and along at least a portion of the periphery and selectively permitting an opening of part of the periphery to provide access to the interior space so that a catalyst material can be placed and replaced into the interior space between the sheets for use of the sheet in the reactor.

\* \* \* \* \*